United States Patent [19]
Gyory

[11] 3,913,925
[45] Oct. 21, 1975

[54] POSITIVE LUBRICATION HYDRODYNAMIC LIP SEAL

[75] Inventor: Emeric J. Gyory, Park Ridge, Ill.

[73] Assignee: Borg-Warner Corporation, Chicago, Ill.

[22] Filed: Nov. 28, 1973

[21] Appl. No.: 419,739

[52] U.S. Cl. .................................. 277/75; 277/134
[51] Int. Cl. ............................................ F16j 15/32
[58] Field of Search .......... 277/96, 96 A, 134, 192, 277/199, 75

[56] References Cited
UNITED STATES PATENTS

| | | | |
|---|---|---|---|
| 2,446,380 | 8/1948 | Meyers et al. ..................... 277/134 |
| 3,044,786 | 7/1962 | Chillson ............................... 277/75 |
| 3,109,658 | 11/1963 | Barrett et al. ..................... 277/96 A |
| 3,586,342 | 6/1971 | Staab .................................. 277/134 |
| 3,685,838 | 8/1972 | Malmstrom ........................... 277/75 |
| 3,738,669 | 6/1973 | Andersen et al. .................... 277/199 |

Primary Examiner—Robert I. Smith
Attorney, Agent, or Firm—James A. Geppert

[57] ABSTRACT

A fluid seal for sealing the space between two relatively rotating members wherein the original seal contact is maintained without any substantial wear during dynamic conditions of use but provides substantially perfect sealing engagement during static conditions. The seal ring includes an annular outer portion, a seal flex section terminating in a shaft contacting surface having a static lip separating inboard and outboard helices that provides a pumping action of the fluid between the seal body and a shaft, and a secondary lip spaced from the static lip toward the fluid side of the seal.

9 Claims, 5 Drawing Figures

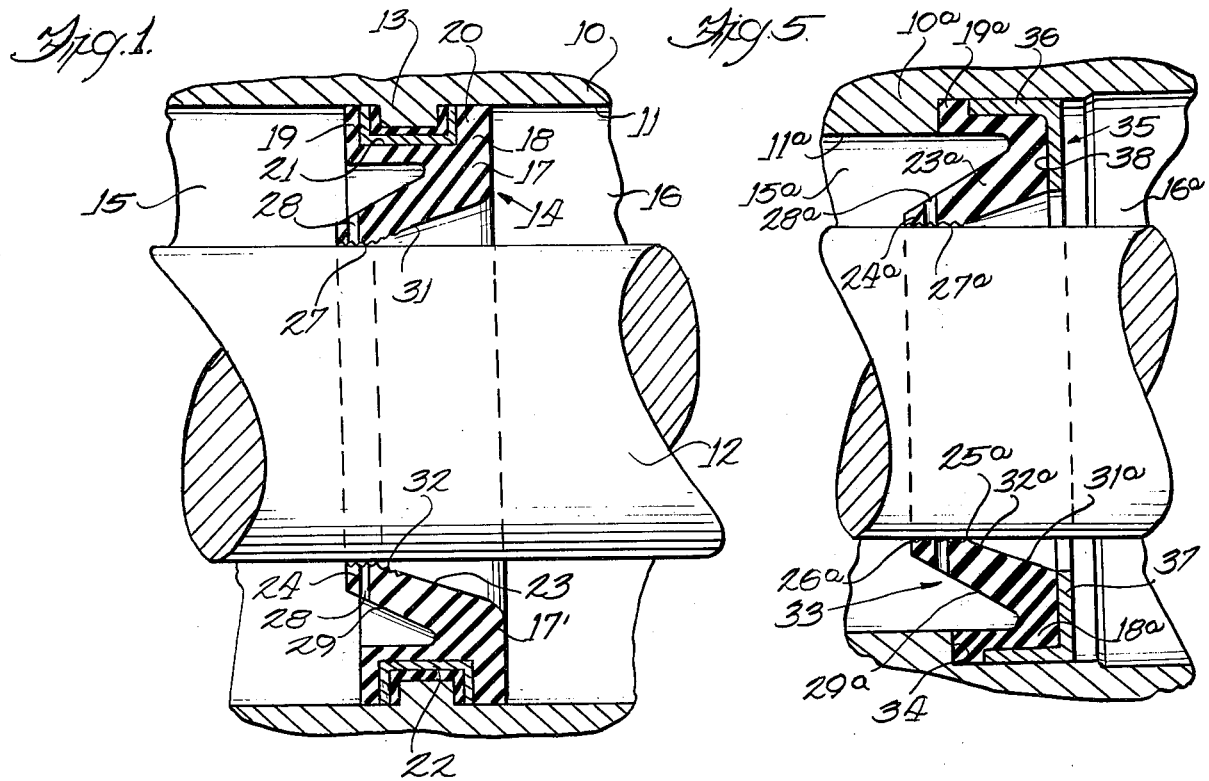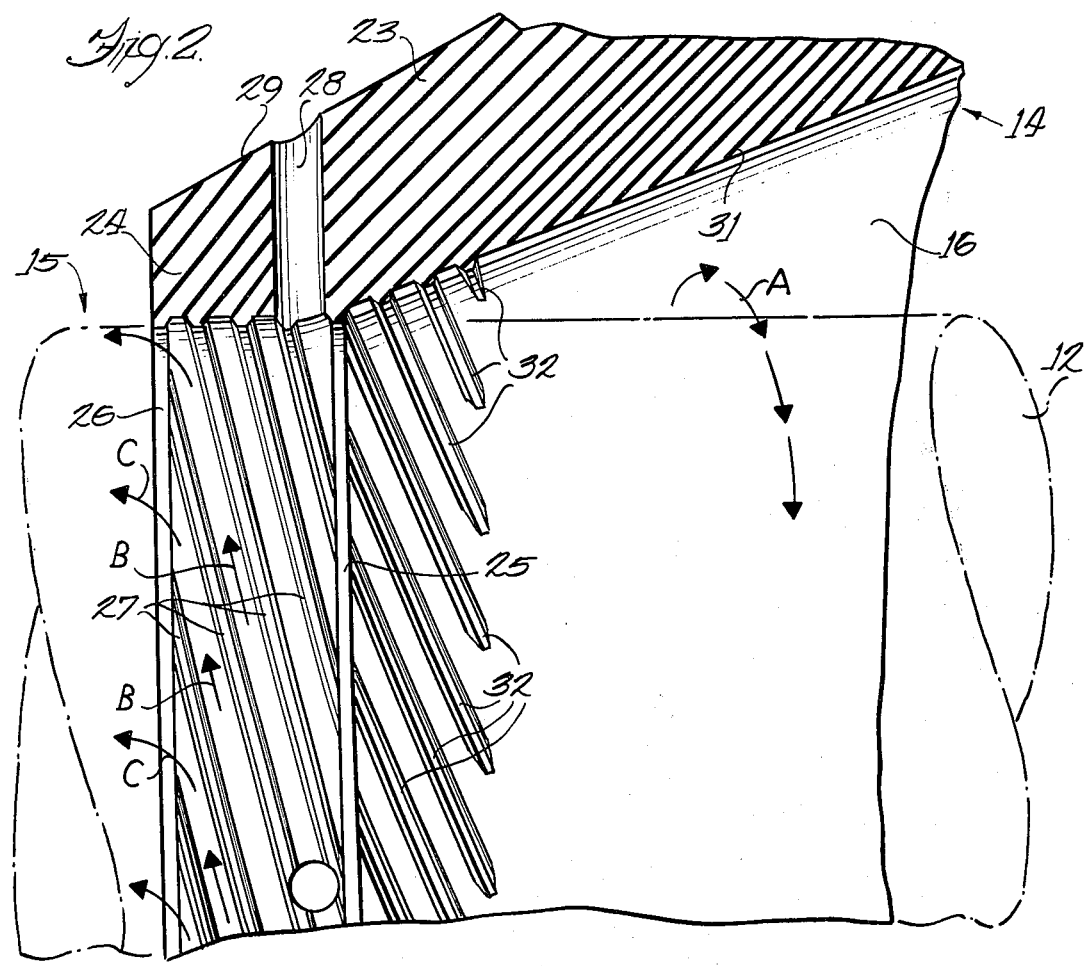

POSITIVE LUBRICATION HYDRODYNAMIC LIP SEAL

BACKGROUND AND SUMMARY OF THE INVENTION

The present invention relates to an improved fluid seal and more particularly to a fluid seal based on the principle of a viscous shear pump and the elastic properties of vulcanized elastomers.

A number of prior art seal constructions have been developed in an effort to provide an effective means of preventing fluid leakage between a rotating shaft and its housing. Such devices may be generally catagorized as continuous contact seals, labyrinth type seals and hydrodynamic seals.

Continuous contact seals include face and lip type seals, packings, O-rings, etc., which theoretically provide effective sealing by pressing a resilient seal material against the surface of a shaft. Substantially all of the elastomeric oil seals effectuate the required sealing action against leakage by a continuous contact seal where a part of the seal normally called a lip is brought into contact with the shaft. Experimentation has shown that a continuous lip has to exert a certain pressure against the shaft for successful sealing. It is also known that a relatively sharp edged seal, combined with the necessary closing lip pressure, will be subject to a relatively fast initial wear and the wear rate will taper off after the lip contact width has increased from a line contact to a width of 0.030 to 0.060 inches.

Experimental evidence shows that during this period of "wear-in," not only the elastomeric lip, but also the rotating shaft will be subject to wear. Certain elastomers will cause a severe shaft wear, so that conditions for subsequent successful sealing will cease to exist. It has been found that the original high rate of wear of the sealing lip was due to the insufficient lubrication of the lip. The present invention provides a seal designed to answer the opposing requirements of a fluid sealing device; namely, to provide leakage free sealing, while maintaining the original seal contact surfaces without wear during dynamic conditions of shaft rotation. This ensures a substantially perfect sealing engagement during static conditions.

Among the objects of the present invention is the provision of a fluid seal based on the principles of a viscous shear pump and the elastic property of vulcanized elastomers. The fluid seal is used over rotating shafts and seals off the opening between the shaft and the housing therefor and includes a static lip in close and continuous contact with the shaft to prevent fluid flow along the shaft to the air side of the seal.

Another object of the present invention is the provision of a fluid seal utilizing a viscous shear pump under the dynamic conditions of shaft rotation. The viscous shear pump includes a plurality of helices extending from and acting to cause fluid flow from the area of the static lip toward the fluid side of the seal. The dimensioning of the seal is such that forces obtained from the viscous shear pumping pressure will lift the static lip off of the shaft during the dynamic conditions of shaft rotation.

A further object of the present invention is the provision of an oil seal which is constantly lubricated thus preventing dry friction, even at the start up of shaft rotation. A secondary lip is located at the inner edge of the seal flex section spaced from the static lip by the helices to provide an appropriate measure of resistance to oil flow. A continuous oil supply is provided in the area between the two lips by feed holes formed in the seal flex section communicating with the interior of the shaft contacting surface adjacent the static lip.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWING

FIG. 1 is a partial vertical cross sectional view through a fluid half seal and housing embodying the present invention with the shaft being shown in side elevation.

FIG. 2 is an enlarged partial vertical cross sectional view of the fluid seal shown in FIG. 1.

FIG. 5 is a partial vertical cross sectional view through a standard full circle type fluid seal embodying the present invention.

DESCRIPTION OF THE PREFERRED EMBODIMENT

Figure 3:
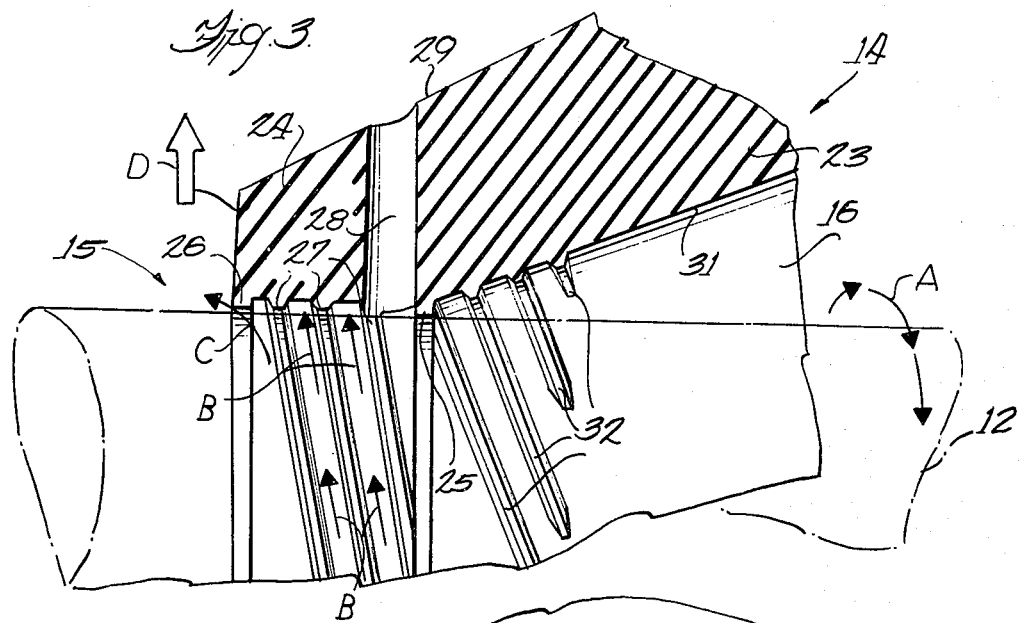
FIG. 3 is an enlarged partial vertical cross sectional view similar to FIG. 2 but showing the directions of oil flow and the forces generated by the pumping of the liquid.
Figure 4:
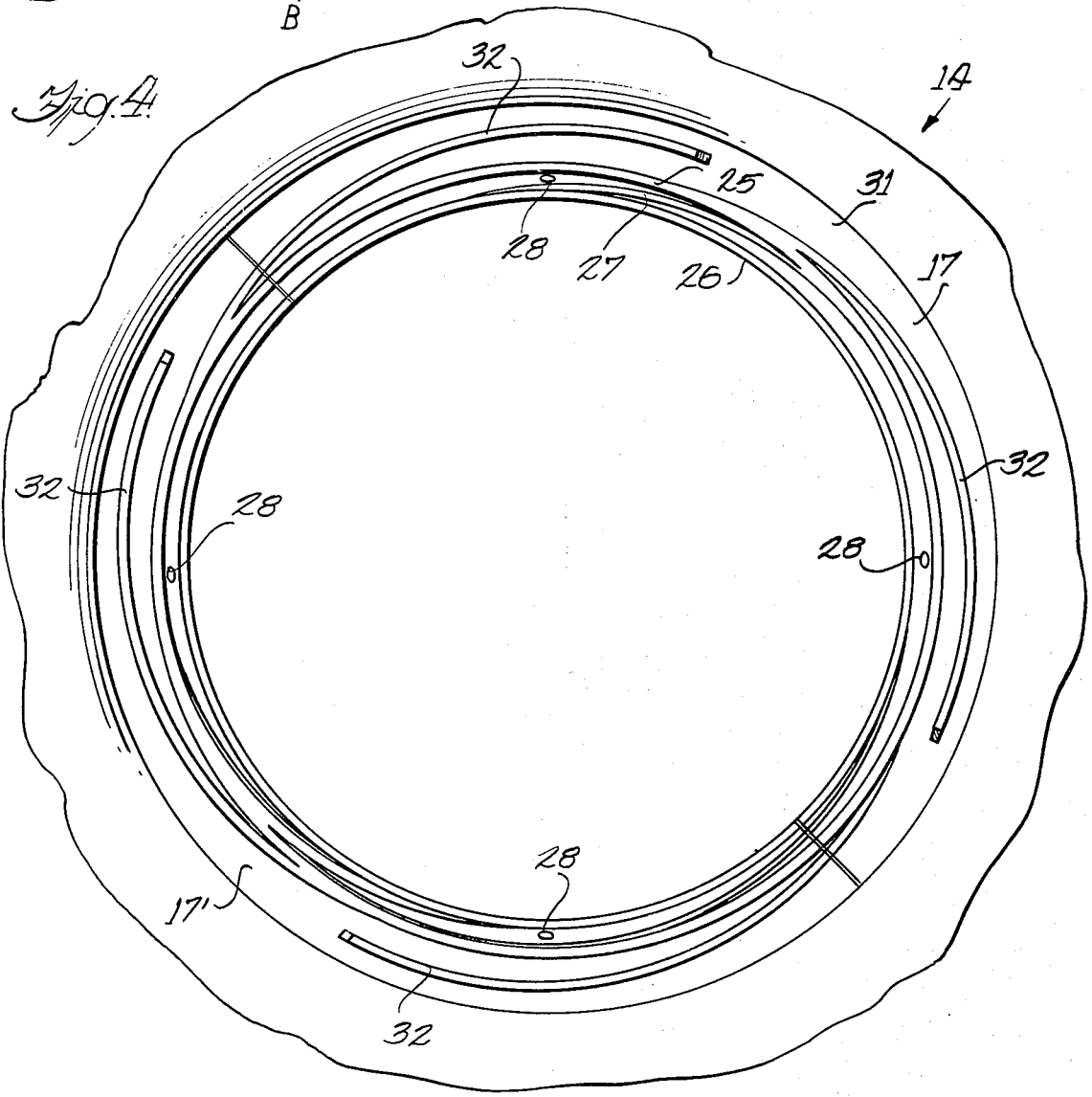
FIG. 4 is an end elevational view of the fluid seal taken from the air side thereof.

Referring more particularly to the disclosure in the drawings wherein are shown illustrative embodiments of the present invention, FIG. 1 discloses a housing or vessel 10 having an opening 11 through which a rotating shaft 12 passes. The housing 10 may be part of an automobile engine rear end utilizing a half seal type fluid seal, and has an annular internal rib 13 positioning a shaft sealing ring 14 formed of a pair of half seals received in the opening 11. The area 15 on one side of the ring contains a viscous fluid, such as oil, and will be denoted as the oil side, while the opposite side of the ring defines an area 16 denoted as the air side. The function of the sealing ring 14 is to prevent leakage of oil from the oil side 15 to and into the air side 16.

The sealing ring 14 is formed of a suitable vulcanized elastomeric material and includes a pair of substantially identical half seals 17, 17′, each half seal comprising a seal body 18 having a pair of axially spaced radial flanges 19 and 20 defining an annular groove or channel 21 therein receiving the rib 13, the body containing a semi-circular metal reinforcing and strengthening band 22 embedded therein and having a generally U-shape in cross section as shown in FIG. 1.

A seal flex section 23 is formed integral with the seal body 18 adjacent the flange 20 and extends inwardly and is angularly disposed to converge toward the oil side 15 of the seal. The flex portion 23 terminates in a shaft contacting area or sealing face 24 more clearly shown in FIGS. 2 and 3. This shaft contacting area 24 is generally cylindrical and includes an inwardly extending annular static lip 25 at the air side edge of the area and an inwardly extending annular secondary lip 26 at the oil side edge.

Between the two lips, the area is provided with an inboard helix section composed of a plurality of helices 27 formed to originate at the static lip 25 and terminate by merging into the secondary lip 26. Also formed in the contact area are a plurality of radially extending openings 28 which extend from the outer oil side surface 29 of the flex portion 23 to open into the inboard helices adjacent the static lip 25. These openings allow oil flow from the oil side area 15 to the inboard helix as will be later described. On the inner inclined air side surface 31 of the flex portion 23 is formed an outboard helix composed of helices 32 merging with the static lip 25 and terminating at a point spaced therefrom; the helices 32 being inclined in the same direction as the inclination of the helices 27.

Static sealing is necessary when the shaft 12 contacted by the sealing ring 14 is stationary. Sealing is accomplished by the static lip 25 being in close and continuous contact with the shaft 12 so that no oil flow along the shaft is possible toward the air side 15. The lip pressure is obtained by an interference fit between the shaft and the lip 25. The secondary lip 26 does not provide sealing because it is located at the oil side 15 and due to the interconnecting oil feed holes 28. Under static conditions, some oil is retained between the static and secondary lips 25, 26 and within the inboard helices 27 connecting these two lips to provide lubrication for start-up of the shaft 12 and prevent dry friction.

Sealing the rotating shaft does not require a close continuous contact between the static lip 25 and the shaft 12 due to the "viscous shear pump" feature of the seal formed by the inboard helices 27 located between the static lip 25 and the secondary lip 26. Without this feature, the static lip 25 would remain in close contact with the shaft 12 and would be exposed to high frictional temperatures and wear. Thus, it is desired to reduce or fully eliminate the contact of the static lip 25 with the shaft 12 under dynamic conditions, and this requires the lifting off from the shaft that section of the seal which is between the static 25 and secondary lips 26. This is achieved by the use of the inboard helices 27.

Under dynamic conditions, the shaft 12 rotates in the direction of the arrow A (unidirectional rotation) and causes oil to be fed into the area bounded by the static and secondary lips through the openings 28 which are circumferentially equally spaced around the seal. The rotation of the shaft 12 coupled with the inclination of the helices 27 causes the oil to flow in an inward direction toward the oil side 15 of the seal. Following the path of the oil arriving through the openings 28 to the vicinity of the static lip 25, the oil is forced to flow between the helices 27 in the direction of the arrows B; the motion of the oil being a result of the shaft rotation and the viscous properties of the oil.

The secondary lip 26 is initially in continuous contact with the shaft 12, but the secondary lip-shaft contact is considerably lighter than the contact pressure of the static lip. The secondary lip does, however, represent a resistance to the flow of oil within the helices 27 and will cause the oil pressure to rise under this portion of the seal. The oil pressure will continue to rise until the secondary lip is lifted and the oil flow then proceeds in the direction of the arrows C toward the oil side 15 of the vessel under dynamic equilibrium conditions.

Due to the dimensioning of the component elements of the seal, the forces obtained from the viscous shear pumping pressure acting outwardly against the shaft contacting area 24 will lift off the inner end of the flex section 23 and thus the static lip 25 from the shaft as seen in FIG. 3 in the direction of the arrow D. Since the direction of oil flow between the inboard helices 27 is away from the static lip 25, a fully hydrodynamic sealing is accomplished. The role of the outboard helices 32 under dynamic conditions is restricted to guarding against eventual stray leakage to the air side 16 by pumping any oil leakage back to the inboard helix section.

FIG. 5 discloses a full circle type seal 33 of the present invention received in an opening 11a of a vessel 10a and positioned abutting a shoulder 34. The seal includes a seal body 18a having a flange 19a abutting the shoulder 34 and an annular space receiving one flange 36 of an annular metal reinforcing band 35; the opposite flange 37 of the L-shaped band extending inwardly along a radial surface 38 of the seal body 18a.

A seal flex section 23a integral with the seal body 18a extends inwardly from the surface 38 to converge toward the oil side 15a of the seal and terminates in a sealing face 24a. This face is generally cylindrical and includes an inwardly extending annular static lip 25a and an annular secondary lip 26a spaced by a plurality of inboard helices 27a. Radial openings 28a extend from the outer oil side surface 29a to open into the helices adjacent the static lip 25a. On the inclined air side surface 31a are located outboard helices 32a merging into the static lip 25a.

The functions of static sealing and dynamic sealing of the rotating shaft with the action of the "viscous shear pump" is identical to that described for the half seal type sealing ring 14. Both sets of helices operate to prevent oil leakage past the seal from the oil side 15a to the air side 16a in an efficient manner.

Thus, the design of a hydrodynamic oil seal involves the principles of viscous fluid flow and resides in the maintenance of flow continuity to the viscous shear pump, formed by the inboard helices 27 or 27a, and the provision for flow resistance to maintain hydrodynamic pressure. The direction of the continuous flow of oil is assured by the pressure gradient set up by the inboard and outboard helices.

I claim:

1. A shaft seal for use between a pair of relatively rotating members under both static and dynamic conditions, one of said members having an opening extending therethrough and receiving said other member therein, comprising an annular resilient seal body adapted to be fixed relative to said one member in a position encircling said other member and an integral inwardly extending inclined flex portion terminating in a generally annular sealing face for sliding engagement with the periphery of the other member, one side of said seal body being exposed to a viscous fluid to be held against leakage, said sealing face including a static lip adjacent the air side of the seal, a spaced secondary lip adjacent the fluid side of the seal, and a viscous shear pump formed in the seal between the spaced lips including a plurality of inboard helices on the sealing face of the seal and extending between the two spaced lips, said flex portion having a plurality of circumferential openings extending from the fluid side of the seal to the sealing face adjacent the static lip, said static lip being effective under static and low speed operating conditions to prevent escape of fluid from said fluid side along said other member, and said inboard helices providing hydrodynamic sealing of the seal under high speed dynamic conditions, said openings allowing fluid flow from the fluid side of the seal to the inboard helices and providing a continuous flow of fluid for hydrodynamic sealing.

2. A shaft seal as set forth in claim 1, including plurality of outboard helices on the air side of said static seal, said outboard helices being of the same inclination as said inboard helices.

3. A shaft seal as set forth in claim 2, in which said flex portion has an inner surface on the air side of the seal inclined outwardly away from the static lip, said outboard helices being located on said inclined surface extending from an area spaced from the static lip to and merging into the static lip.

4. A shaft seal as set forth in claim 3, in which said seal is formed of a pair of abutting half seal type seal rings.

5. A shaft seal as set forth in claim 3, in which said seal is formed of a full circle type seal ring.

6. A shaft seal as set forth in claim 1, in which said secondary lip engages the other member under static conditions and produces a pressure build-up in the area between the lips upon circulation of fluid by the inboard helices under dynamic conditions causing the fluid pressure to lift the flex portion of the seal, including the static lip, away from the other member and provide hydrodynamic sealing of the other member.

7. A shaft seal as set forth in claim 1, including outboard helices formed on the air side of the static lip to pump any stray fluid leakage past the static lip back to the inboard helices.

8. A shaft seal as set forth in claim 1, in which said flex portion is angularly inclined inwardly and downwardly toward the fluid side of the seal with an inclined surface exposed to the fluid, such that fluid pressure acting on the inclined surface urges the sealing face against said other member.

9. A shaft seal as set forth in claim 8, in which said openings open through said inclined surface.

* * * * *